March 30, 1948.  J. L. ASHFORD ET AL  2,438,490
WELDING CONTROL SYSTEM
Filed June 22, 1943
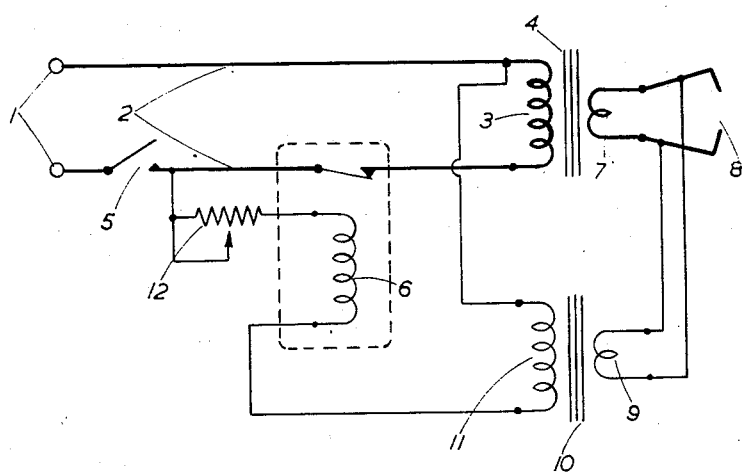
Inventors
James Leslie Ashford.
William Alfred Billings.
By
Attorney Patented Mar. 30, 1948

2,438,490

UNITED STATES PATENT OFFICE 2,438,490

WELDING CONTROL SYSTEM

James Leslie Ashford and William Alfred Billings, London, England, assignors, by mesne assignments, to International Standard Electric Corporation, New York, N. Y., a corporation of Delaware Application June 22, 1943, Serial No. 491,752
In Great Britain July 31, 1942

2 Claims. (Cl. 219—4)

This invention relates to electric welding and to machines therefor.

The object of the invention is to ensure good and uniform spot welds over a range of thickness and materials without having to make adjustments. This object is attained by an automatic welding control whereby the quality of weld is made independent of the operator and so is not affected by operator-fatigue, noticeable towards the end of the day, or by changes in personnel. The most satisfactory type of control is one which will stop the weld when fusion has taken place, irrespective of current and time, rather than a pure time control. This is especially so when a machine is required to make a number of differing classes of weld without resetting.

It is the further object of the invention to weld together work pieces of different materials, and particularly of materials having different melting characteristics.

To make a true weld, the metal of both workpieces must be brought to welding temperature as nearly simultaneously as possible. This will produce a sharp and effective response by a relay controlling the supply circuit. To obtain this condition when working with similar metals is a comparatively simple matter, but when the specific resistances of the metals are widely different it is practically impossible of attainment with the normal copper electrodes. The difference must be compensated for by using another material for one or both electrodes and it is the method of selection of such material that is outlined below. It is possible to obtain adhesion of the two metals without special electrodes, but as this would occur at the fusing point of only one of them it would not be a true weld. Also it is sometimes possible to bring both metals to forging temperature by repeated attempts on the same spot, a possible explanation of this being that the resistance of one electrode tip is modified owing to oxidation under the excessive heat, resulting in some degree of compensation as mentioned above. This is far from satisfactory, however, intermittent welding and burning frequently resulting from such procedure.

To understand this compensation method, it is necessary to consider just how and where the welding heat is generated. There are three factors affecting the distribution of voltage drop, throughout the welding spot, these are (a) the values of the resistances of the two metals, (b) the two electrodes and (c) the three intervening contact surfaces between them. The latter will be governed by the electrode pressure which, it is assumed for the purpose of this explanation, will be set to the correct amount and can be regarded as a non-variable.

Considering first the case of a weld between similar metals, the generation of heat, being proportional to voltage drop, will be equally divided between the two metals being welded if they are of the same thickness and this balance will not be greatly upset if the thicknesses differ, as the excess of heat in the thicker material will be absorbed by the equally greater mass.

On further consideration of these factors in the case of a weld between metals of differing resistance characteristics, it is obvious that the passage of current through the metal with the higher specific resistance will generate more heat in proportion. Moreover, the heat will be dissipated more slowly owing to the lower thermal conductivity, the latter property being roughly proportional to the electrical conductivity. From this it will be seen that the heat available is proportional almost to the square of the specific resistance of the metals being welded and that the balance of heat is greatly upset, causing burning of one workpiece while the other is not melted.

It is this difference in available heat which must be compensated for, and to do this it is necessary to make use of the heat generated at, or in close proximity to, the contacts between the electrodes and the metals being welded. If the electrode contacting with the metal having the lower specific resistance is tipped with a metal, or other conducting substance, whose resistance is higher than that of the metal, greater heat will be generated at that contact or at least near enough to the contact to provide the extra heat which is needed to complete the weld.

The melting point of this substance must be high enough to resist the tendency to stick to the job and suitable materials are tungsten, tungsten carbide, molybdenum, tantalum and the Elconite series of alloys. The tips can be in the form of a disc, let into the copper electrode or, when working with the point, a rod let into a boring along the axis of the electrode similar to the lead in a pencil. The tip must be well jointed to the copper in order to ensure dissipation of excess heat at the tip.

Choice of material for the tip may be made by bearing in mind an empirical law which appears to work out well in practice. "The sum of the specific resistances of the electrode tip and the workpiece in immediate contact therewith should be approximately equal for both halves of the weld." This assumes that the melting points of the two workpieces do not differ greatly, where this is not so, compensation may still be made, but a high melting point must be allowed for in the same manner as a low resistance and vice-versa. The above method has been applied successfully to the following combinations: copper-nickel, copper-molybdenum, copper brightray, nickel-molybdenum, tungsten-nickel, copper-carbonised nickel. Certain other combinations require some means of preventing the oxidation and crystallisation of one of the workpieces. This may be done by providing a small cup around the tip of the lower electrode which will hold a mixture such as water and methylated spirit completely immersing the tip.

The invention will be described with reference to the accompanying drawing which shows the circuit of a spot-welder control gear.

As shown in the drawing, the mains terminals 1 are connected by the heavy current lines 2 to the primary 3 of the welding transformer 4, these lines including the normally-open initiating contacts 5 and the normally closed contacts of a relay 6, the relay circuit being drawn in relatively thin lines. The relay 6 is preferably of the quick-acting mercury contact type as described in the co-pending American application Serial No. 491,753, filed June 22, 1943, by J. L. Ashford.

The secondary 7 of the welding transformer 4 is connected to the welding electrodes 8.

Across the electrodes 8 is connected the primary 9 of a special transformer 10. The secondary 11 of this special transformer is connected in series with the winding of relay 6 across the mains supply so that mains voltage is applied to this combination at the same time as the weld is initiated.

With such an arrangement use is made, to cut off the welding current, of the sudden reduction in resistance of a weld which occurs when the correct welding temperature is reached and fusion has taken place. This resistance drop is made to interrupt the primary current, the circuit being reset by opening the initiating contacts 5, usually operated by a foot pedal. The primary winding 9 of the special transformer 10, being connected to the electrode arms, picks up the voltage at a point where it will drop when the weld resistance is reduced.

The contacts of the relay 6 are in series with the welding transformer primary but do not open immediately owing to the counter E. M. F. generated in the secondary winding 11 of the special transformer. This E. M. F. is stepped up from that picked up at the electrodes and will therefore drop when the weld is made, so allowing the relay to operate and cut off the power to the welding transformer. The relay 6 then returns to normal on release of the foot switch 5.

An adjustable resistance 12 included in the relay coil circuit is set when making initial adjustments and needs no further adjustments excepting under exceptional welding conditions.

When using a mercury switch as disclosed in the above-mentioned copending application one may eliminate the transformer by the addition of a second winding of a suitable number of turns on the mercury switch solenoid itself, this switch then taking over the function of the transformer.

What is claimed is:

1. In an electric welding apparatus, a pair of electrodes, a source of voltage, transformer means having a primary winding connected across the source and a secondary winding connected across the electrodes to produce a voltage across the electrodes when the electrodes are open, a relay having contacts connecting source and primary winding, and an armature opening the contacts when energized, means for producing an electromagnetic field energizing said armature in response to the source voltage and means for producing another electromagnetic field opposing the energizing field in response to the electrode voltage to de-energize the armature and to open the contacts when fusion at the weld takes place, said relay having a coil for energizing the armature, and said last mentioned means including a second transformer means having a primary winding across the electrodes and a secondary winding in series with the coil, said coil and said last mentioned secondary winding being connected parallel to the source.

2. In an electric welding apparatus, a pair of electrodes, a source of voltage transformer means having a primary winding connected across the source and a secondary winding connected across the electrodes to produce a voltage across the electrodes when the electrodes are open, a relay having contacts connecting source and primary winding, and an armature opening the contacts when energized, means for producing an electromagnetic field energizing said armature in response to the source voltage, and means for producing another electro-magnetic field opposing the energizing field in response to the electrode voltage to de-energize the armature and to open the contacts when fusion at the weld takes place, said relay having a coil for energizing the armature, and said last mentioned means including a second transformer means having a primary winding across the electrodes and a secondary winding in series with the coil.

JAMES LESLIE ASHFORD.
WILLIAM ALFRED BILLINGS.

REFERENCES CITED

The following references are of record in the file of this patent:

UNITED STATES PATENTS

| Number | Name | Date |
|---|---|---|
| 645,066 | Brown et al. | Mar. 13, 1900 |
| 1,959,690 | Roth | May 22, 1934 |
| 1,991,414 | Rees | Feb. 19, 1935 |
| 2,306,593 | Callom | Dec. 29, 1942 |

FOREIGN PATENTS

| Number | Country | Date |
|---|---|---|
| 408,431 | Great Britain | Apr. 12, 1934 |